March 10, 1953 R. C. DAVIS 2,631,031
LOAD SUSPENDING DEVICE
Filed May 3, 1948 4 Sheets-Sheet 3
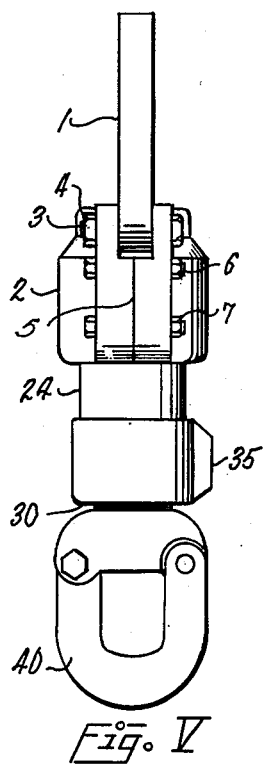
Fig. V
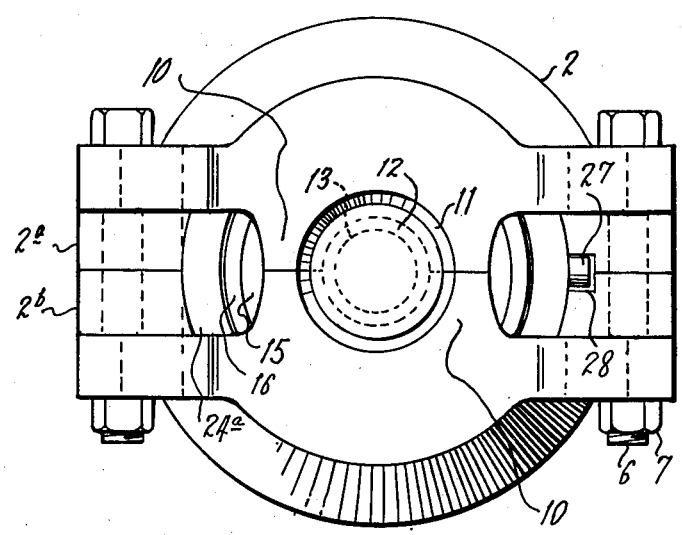
Fig. III
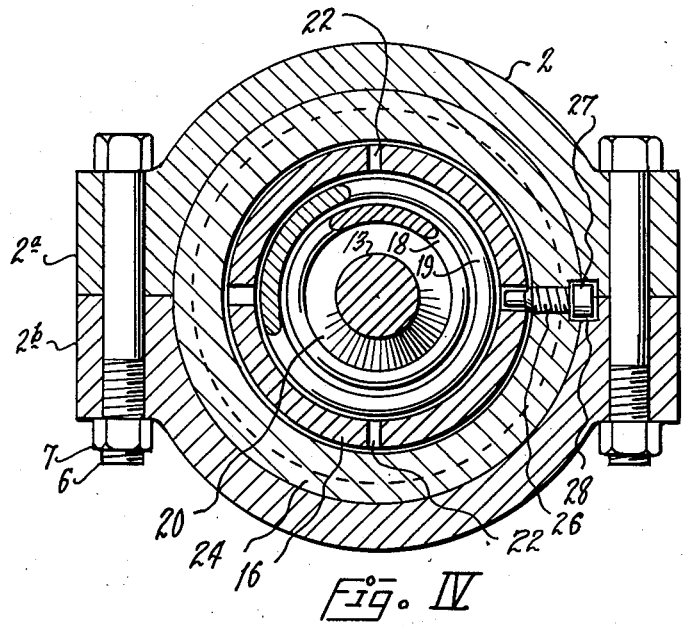
Fig. IV
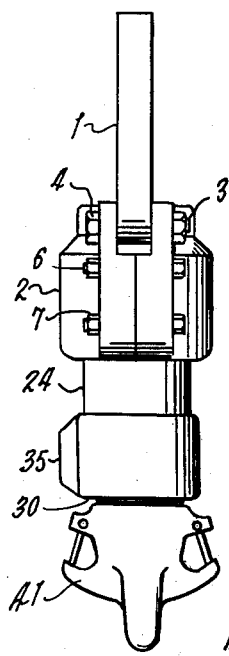
Fig. VI
INVENTOR.
Roy C. Davis
BY
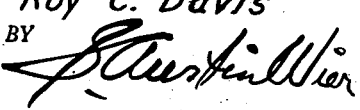
ATTORNEY

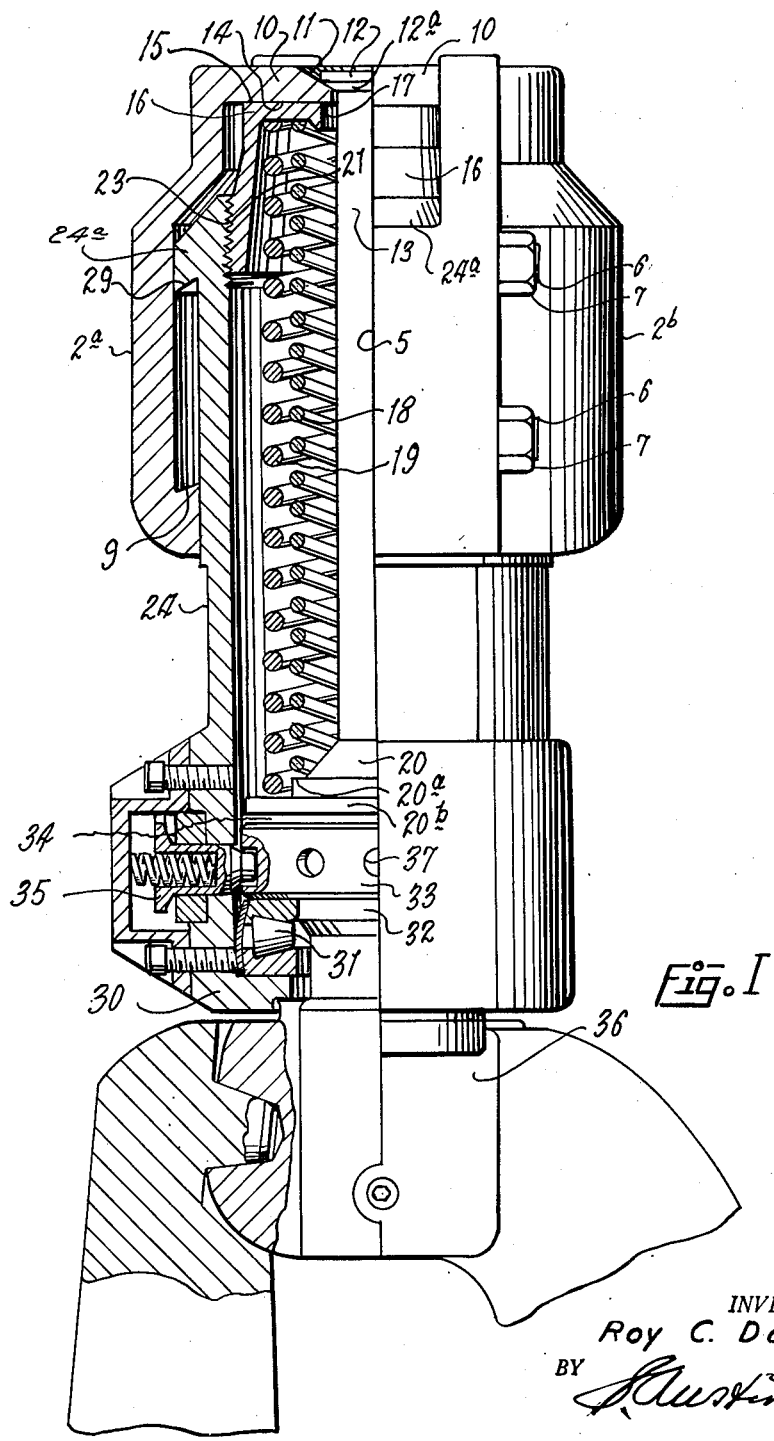

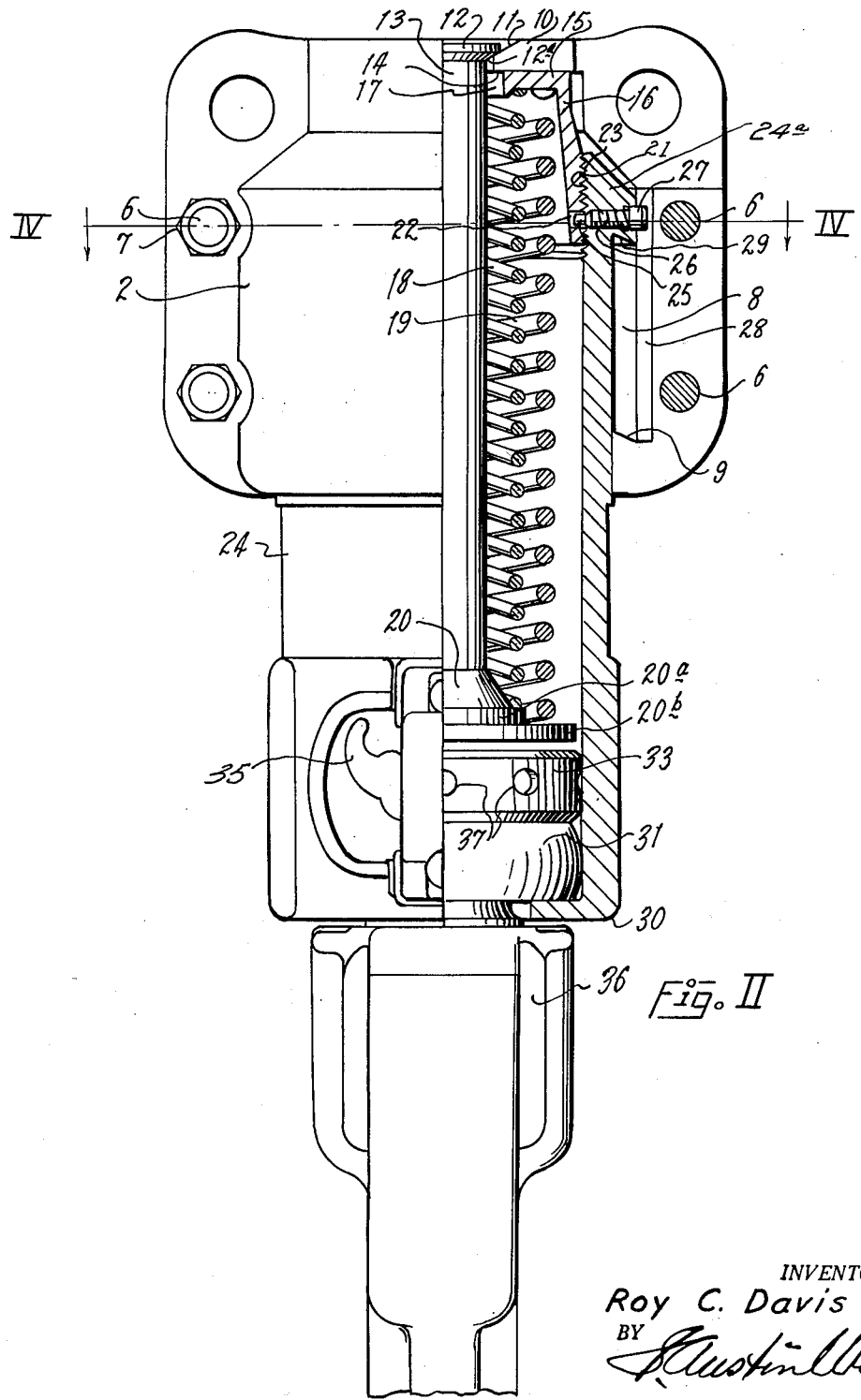
Fig. II

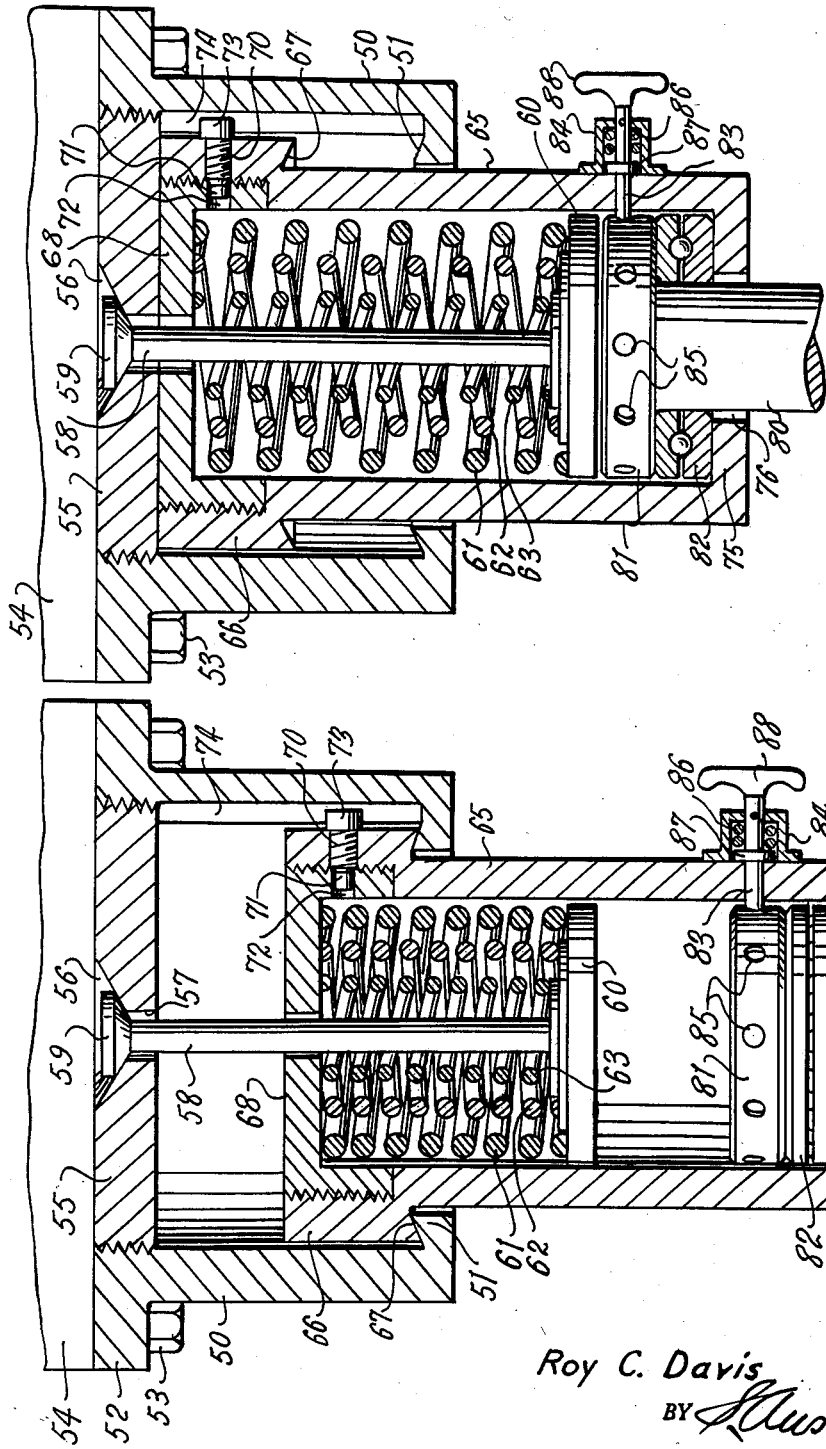

Patented Mar. 10, 1953

2,631,031

UNITED STATES PATENT OFFICE 2,631,031

LOAD SUSPENDING DEVICE

Roy C. Davis, Dallas, Tex., assignor to The Guiberson Corporation, Dallas, Tex., a corporation of Delaware Application May 3, 1948, Serial No. 24,816

6 Claims. (Cl. 267—70)

This invention has to do with a resilient member for carrying loads in oil field operations, and particularly in the drilling, maintenance and cleaning of oil wells. My device may also be used in other types of wells, as in wells for water, gas, etc.

This invention may be more accurately described as a specialized spring-loaded slip joint. It is especially useful for mounting between a block and a hook, or between a block and a becket, or between any two other members which may be elevated by cable, and where it is desirable that some resilient or shock absorbing member be disposed between them. In elevating and lowering well machinery such construction is very useful; and my device is of particular utility in the handling of pipe and tubing, especially when joints thereof have to be unscrewed, or put together.

Ordinarily the support maintained over an oil well, through the use of a line or cable, suspending links, elevators, pipe, kellys, bits, casing, tubing and other heavy members used in oil drilling or operations, is stiff and unyielding. This crude arrangement allows little or no "give." Such a situation is frequently found dangerous to life and limb and damaging to equipment. At all times it is difficult to connect and disconnect members which are so held as to not yield to some extent. Under such conditions both the making of pipe connections and the breaking of pipe connections are extremely difficult to effect.

With the addition of my device, I produce a "soft action" in the engaging and disengaging of pipe threads and in the making and unmaking of any kind of joints, as when pipe is added or removed from a well string. The effect is to give a highly desirable "sprung-linkage" in the hoisting tackle. Shock is relieved, stress is lessened, labor is made easier, connections are made more quickly, and there is less damage to threads.

My device also results in speedier and less expensive operations, giving greater life and usefulness to tools, cable, block, hook, derrick, boom and any other tools, equipment and materials which are ordinarily subjected to shock (where my device is not used).

Through the use of my invention lateral thrust is lessened and minimized. It is more difficult to bend my short, stocky device, when it is used as a connecting member between a block and a hook, than is the case with the old fashioned, relatively long and slender, and less well designed connectors used in such position.

Springs have been placed in position between a block and a hook before my invention; but since they alone may not be relied on to carry the full load in oil field operations, it has been usual to extend some suitable load-carrying member upward through a coil spring.

Such early construction requires a rather elongated load-carrying member, for the simple reason that a long spring is required. This is so, as a practical matter, because the heavy load placed on such spring is a load of quick compression; and nothing less than a relatively long coil spring will add any considerable resilience to the hook-up. This produces the very much undesired and unsatisfactory result of having a long slender shank exposed (being the load-carrying member extending through the collapsed spring). This elongated shank is exposed either below or above the spring when it is in compression; and the result is that a bending stress is quickly and easily developed. Also the useful height of the derrick is lessened by the exact length of the unnecessary and exposed part of such shank. It is not difficult to knock a turtle's head off when his neck is stuck out.

To put it shortly, a long slender shank is very unsatisfactory in tools of this character. Yet, it appears that the conventional elastic load-carrying member is, without exception, of the turtle neck type. It provides a load-carrying member extending into, or through the spring member. My invention eliminates the long train of ills which flow from this very unsatisfactory and exposed design and the resulting weakened construction.

The general objects of my invention may be collected from the foregoing statements and from the disclosures of the drawings. However, the objects may be made more clear in the detailed statements which follow.

Among the primary objects of my invention will be found the advantages arising from the provision of a resilient link of relatively short length and of relatively great width. My invention has proved that there is stronger construction in my design of shorter length.

My invention accomplishes the desirable object of the elimination of a load-carrying member extending into or through the spring member. I have the object of providing a primary load-carrying member entirely outside of the spring member or members.

Because my invention eliminates the conventional practice of extending a load-carrying member through the springs, it becomes obvious that I may carry a greater number of springs within a given compass. I can have more spring resilience provided within less height, and the same diameter. I use a case of tubular members in which there is no space-occupying primary load-carrying member.

One of my important objects is to provide a primary load-carrying member entirely outside of the springs. Such member then functions in the dual capacity of a casing for the springs and of a primary load-carrying member.

One of the greatest defects in old style spring-loaded extensors is found in the very discouraging and sometimes dangerous action of the dragging of the spring, which results in the braking or slowing of the rotation of the swivel action ordinarily required between block and hook. There is a positive danger to operators and workmen when a spring becomes coiled up because of "drag" and friction. When rotation of the swivel is attempted, such springs often hang up; and this comes about because of frictional drag, and/or the cutting by the ends of the spring into the top or bottom or sides of the member carrying the spring. In these old devices there is no divorcement between the swivel and the resilient spring structure.

My invention has eliminated the use of any special thrust bearings to accommodate or dissipate the friction of the rather stout springs in devices of this kind. My construction makes absolutely unnecessary any kind of bearing to dissipate such friction. In my construction the springs do not rotate; the rod around which the springs are arranged does not rotate; the casing arranged around my springs does not rotate. I have succeeded in completely divorcing the entire spring assembly from the rotatable load-carrying member. I have arranged the latter member separate and apart from and entirely below the spring assembly; and one does not affect the other at all.

Therefore, I use no thrust bearings on the spring assembly. I use only one axial thrust bearing on the rotatable member (which is carried below the spring assembly). Old style devices have been found to require and to use one or two or even three sets of bearings to ease the friction occasioned by the springs themselves. This is not only unnecessary in my invention, but it is impossible. I have eliminated rotative drag on my springs altogether. In fact, I prevent these springs and their housing from rotating. Such novel design is indeed valuable, dependable and safe.

Furthermore, I have eliminated the great wearing and destruction of thrust bearings which takes place so rapidly under old style spring-loaded connectors, in which the thrust bearings are under considerable load, both when the connector member is loaded and when it is not. In these old style arrangements, the springs themselves throw a heavy load and much wear upon the bearings.

All of the above indicated improvements and objects in my invention also result in a further great economy in that my tool effects considerable increase in the useable space, vertically considered, within the derrick. Every shortening of the block and hook and of the connectives therebetween has the effect of increasing the height of the derrick, mast, or boom, from which these members are swung.

Of considerable economy and novelty, and itself constituting a beneficial object, is the unusual way in which I provide against the rotation of my slip joint. I utilize a single member (which may be called a key, a pin or a bolt) one end of which prevents the cap of the spring housing from becoming unscrewed, and the other end of which provides a head, which may move vertically in a slot of the outer telescopic member. I need the pin or key in the screw cap; but I employ no extra piece or member to lock the telescopic casings against relative rotation. My simple and single pin does double duty.

Of great value is the simple and always dependable adjustability of my spring assembly. To adjust the relative resilience of the single spring in old style devices has heretofore simply meant that the spring was either compressed more or less. The limit of such adjustment to elasticity was usually very narrow.

I have produced a spring housing in which there may be arranged a veritable nest of springs, one or two or three or four (or even more). I may adjust the resilience of my nest of springs merely by adding to or taking from the number of springs carried within the spring housing.

It should be obvious that a "treble" of drill pipe or tubing (three lengths of pipe), which is a common and practical multiple for the connecting or disconnecting of such pipe, will weigh at least three times as much as the "single" of such pipe. Therefore, a spring which would carry the "treble" with safe and easy resilience would give little or no resilience to the lighter single piece of pipe. The reverse is true. A spring of such tension as to safety float a single length of pipe, would afford no resilience at all when three times that much weight was placed on it.

Whatever may be the nature of the work, it is quite easy for me to arrange my spring assembly to carry either one or two or three lengths, affording full floating ease in the threading and unthreading of these pipes. My spring assembly can be so adjusted, maintained and operated, that my invention will always operate to absorb the relative axial movement of the two parts of the string of pipe when they are being unscrewed. This prevents excessive stress and wear on the threads and on the facilities employed in making and breaking threads. No device heretofore known appears to have the relative "flexibility" of my resilient load-carrying member.

I also have the further means of adjusting spring tension by simply raising or lowering the spring-retaining cap on my spring housing.

I have eliminated the complicated latching mechanism which was heretofore constructed to function as three separate latching devices. The usual spring loaded member, heretofore used as a connective link between a block and a hook, was required to allow relative axial movement between an upper part and a lower part of the device, without allowing rotative movement between them, yet attempting to allow full rotation of the heavy load-carrying column around which the spring was disposed.

We get into complications when we attempt to make one latch allow certain members relative rotation while preventing it in others, and, all at the same time, allow axial movement in the members held from rotation. Such latches have not always worked. They have been unsafe and dangerous. I have so separated these operations that my swivel member is controlled by a simple plug, which can be set in or out, as desired, to lock or release the swivel. This is quite separate and apart, and in no way complicated with the equally simple pin or bolt which at all times prevents the two members of my telescopic spring housing from relative rotation. My separate locks insure safety.

The drawings show two forms in which my invention may be made; and the invention may be practiced and its objects carried out with still other forms of devices. Therefore, it should be understood that I am not limited to the structures disclosed in the accompanying drawings in the practice of my invention and in the achieving of the objects thereof. With this understanding let it be pointed out that:

Fig. I shows a partially sectionalized side elevation of one embodiment of my invention.

Fig. II shows a partially sectionalized elevation of a front view of the device shown in Fig. I.

Fig. III is a plan view of the device shown in Fig. I, as seen from above.

Fig. IV is a cross sectional view taken along the line IV—IV of Fig. II.

Fig. V shows an elevation of the left side of the device disclosed in Fig. II, with a bail attached above the device and a becket hung below it.

Fig. VI is an elevation of the right side of the device shown in Fig. II, with a bail attached above it and an adapter with two side arms below it.

Fig. VII is a partially sectionalized elevation of a modified form of my invention, showing the device under load.

Fig. VIII is a partially sectionalized elevation of the device shown in Fig. VII, without load.

The various parts of this device are indicated by numerals; and like numerals indicate like parts.

The numeral 1 indicates a conventional bail, which may be detachably connected to the upper part of my device, so that it may be easily suspended, raised and lowered, on a cable (which may be carried through the bail), the cable not being shown in the drawings. The cable may run over the crown block in the top of the derrick; or it may be carried over any convenient pulley; or it may be simply fastened to some convenient eye or pin in a mast or derrick.

Although a travelling block (provided with conventional sheaves therein) may be, and often is, used with my device, such block is not shown in the drawings; but I wish it understood that it may be substituted for the bail 1, which is indicated in the drawings.

Pins 3, carrying nuts 4, may be used for the engagement of the bail or the block, and/or of other suitable pieces of equipment, whenever there is need to have them attached to the upper part of my resilient load-carrier.

The main body or casing of my tool is usually made up of the lowermost and inner housing 24, together with the uppermost and outer housing 2; and the latter, in one form of my device, is divided into two like halves 2a and 2b. These two halves may be held together along their common face 5 through the use of housing bolts 6, which are fixed in place and held securely by nuts 7.

The housing members 2 and 24 are generally cylindrical in appearance; and they are hollow. The former terminates in its lowest part in an inwardly disposed ledge or shoulder 9, the upper face of which is preferably made to slant outwardly and downwardly from its innermost edge.

The uppermost part of the outer casing 2, where such casing is made of a pair of like and complementary members, meeting along the common face line 5, is provided with a horizontally disposed top, which is so designed and constructed as to produce (in each half of this housing) a pair of fingers 10, which fingers point toward the medium line 5.

A counter-sunk and beveled bore is so made through the top of the casing 2 as to provide a circular hole, one-half of which lies in the top of the half casing 2a, with the other half lying in the top of the half casing 2b. This hole is placed in the center of the casing top; and it is so arranged as to provide a downwardly inclined and wedge-like shelf 11, extending entirely around the periphery of the hole, defining the edges of fingers 10, which lie about the bore indicated.

I provide a simple spring-supporting shank 13, which has a round head 12, the head being provided on its under side with a beveled face 12a. This bevel is complementary in inclination to the upwardly-looking bevel 11 surrounding the central opening through the top of casing 2.

The lowermost part of shank 13 is provided with (or made into) a base 20; and this base may have a plurality of successive ledges or laterally extending levels thereon, such as the spring seat 20a and the spring seat 20b (and as many more spring seats as may be desired to support a nest of springs, arranged one within the other). The base 20 may be made integral with the shank 13; or it may be pinned or keyed thereto; or it may be threaded thereon, and removable therefrom. The same construction may be employed in affixing the head 12 to the shank 13. The manner of affixing (whether removably attached or made integrally) is not important, provided the whole thing is well assembled and firmly made together.

The bottom face 14 of the fingers 10 should be made smooth, to act as a stop for the spring cap 16, and its uppermost or head portion 15. It is to be noted that the part 15 is provided with a central bore 17, which bore should be made sufficiently large to allow the passage therethrough of the head 12 of the shank 13; but this bore should not be as small as the central bore in the head of casing 2, through which head 12 may not pass.

This construction allows the head 12 to be integrated with the shank 13 whenever the housing 2 is made of split members 2a and 2b. When these members are brought together and bolted up, with bolts 6 and nuts 7, then the beveled fingers 10 come underneath the head 12 and lift up the entire shank 13, including the base 20, and its supported nest of springs.

A number of coil springs may be used such as the inside spring 18, and the outside coil spring 19, to make up a nest. Further and additional springs may be provided, encircling those indicated, or arranged within those indicated (or intermeshing between them). The spring nest is intended to employ any of a wide range of spring combinations, to fit the needs of any load.

It is to be observed that the entire spring case is free to be filled with springs. It does not have any load-carrying member in it. The only other member within the spring case (and within the entire vertical travel of these springs) is the spring-carrying shank 13. This shank is a lightweight member which is never required to carry any other load than the spring tension itself.

The wall of the cylindrical casing 24 is provided on its upper end with an externally disposed band 24a, which may be slanted downwardly and outwardly from its uppermost face, if desired. In the region of the band 24a, the inner wall of cylindrical housing 24 is provided with straight threads 23, such as would be free running threads. Complementary threads 21 should be provided on the lowermost and outer face of the spring cap 16. When threads 21 are made up into threads 23, by spinning the cap 16, then it will be seen that certain vertical adjustment may be made of the space lying between the top 15 of the cap 16 and the base 20 of the shank 13. Such space will define and limit the extension of the springs 18 and 19 (when not under load). It should be apparent how this adjustment may be made from time to time.

In order to preserve any determined adjustment of spring tension, the threaded peripheral wall or face of cap 16 should be provided with a series of holes or notches 22. These notches should be sufficient to accommodate the dog point 25 of the threaded key 26, arranged to pass through the band 24a in the wall of the member 24. Cap 16 is thus locked and prevented from turning. This key has a further function, which will be discussed later.

It should be apparent that the members 2 and 24 constitute telescopic cylinders. The shoulder 9, in the upper casing 2, has been already described. It is to be noted now that there is provided a complementary shoulder 29 in the outer and overhanging wall of band 24a; and shoulder 29 is made to engage shoulder 9 when the tool is under full load and the springs are compressed as far as the axial travel of the telescopic member will permit.

There is provided the vertically disposed keyway or slot 28, one-half of which is made in each of the faces 5 of the like members 2a and 2b, together constituting the upper housing 2. The head 27 of the key 26 may move axially in the slot 28, so as to allow full vertical movement between the housings 2 and 24, but head 27 prevents the relative rotation of these housing members. Thus, the member 26 has two functions. It prevents the mis-alignment and rotation of the two housing members, and it prevents the cap member 16 from losing its adjustment.

Rotatably carried below my resilient connecting member or link may be found a hook 36, whenever it is desired to carry a hook. Any conventional hook may be substituted for that shown on the drawings, and therefore this disclosure of member 36 is merely fragmentary. A threaded spindle 32 may pass down into the hook and be permanently keyed or pinned thereto. Quite conveniently this spindle 32 may be provided with a round disc or head 33, to fit inside the lowermost part of housing 24. Below head 33 and above the base 30 (the latter being the annular horizontal return of the casing member 24 at its lowermost end) there may be disposed a suitable thrust bearing 31. Such construction will allow the hook to rotate freely, and the weight thereof is carried on the bearing.

This construction does not in any way place any spring-created limit, drag, brake or other kind of hindrance, on the freedom of rotation of the hook member, or of the spindle carrying it. This same observation is, of course, true for any member which is substituted for the hook 36. For instance, in place of a hook, we may have a becket 40, or an adapter 41, the latter being a device providing a plurality of extra arms for attaching elevators, chains, bails, cables or other members, as may be desired.

The number of tools, devices and contrivances which may be rotatably carried on the spindle 32 are too numerous to catalogue here. The important point to remember is that whatever is so carried the same may rotate freely, without any hindrance being offered by the springs carried within the spring casing of my special spring-link device.

Care is always exercised to provide the clearance 34 (which is nothing more or less than a space) between the lowermost face of base 20 (or of its sub-member 20b) and the uppermost face of the head 33 of the rotatable spindle 32.

The length of shank 13 as related to the overall length of the composite telescopic casing, 2 and 24, when the members thereof are in shortest compass, determines the extent of the clearance 34. My device simply cannot drag.

Around the periphery of the head 33 there may be arranged some holes as at 37, so disposed as to receive the nose end of a spring loaded latch 35, which may be so affixed to the outer wall of the lower part of the casing 24 as to pass therethrough. While a suitable latch 35 is shown, it is to be understood that any other device or contrivance which may be used as latching or locking mechanism, engageable and disengageable with the head 33, may be used. The only purpose of such a device as the member 35 is to allow the rotatable head 33 and the rotatable spindle 32 to be locked in any position that the operator may desire, thus fixing and rendering non-rotatable the hook 36 (or any member substituted for the hook).

This construction is here detailed to some extent to make abundantly clear that the freedom of rotation of the hook member (or substitute) and, likewise, the locking of such member against rotation, all may be and is carried out in my device without in any wise interfering with the spring arrangements within my telescopic members 24 and 2. Above all, it must be recognized that springs 18, 19, etc. may (in my method and design of construction and operation) place no limit or drag or hindrance upon the rotative motion of any tool carried below the base 30 of casing 24 of my expansible device.

The simplified and dependable, safe and friction-free operation made possible by my method of divorcing the axial movement of telescopic members from the rotative motion of a hook member (or its substitute) is of utmost importance, and constitutes quite an improvement over the prior art of devices offering spring-linkage in a hook-up designed to raise and lower weightly objects in well operations.

Notwithstanding that I have hereinabove described in some detail, and committed most of the drawings to the delineation of one preferred form of my invention, it must be recognized that the principles and objects of my invention may be as easily practiced by other and further mechanical arrangements. To make this abundantly clear, and to show another perfectly satisfactory and operable mechanism, which is different from that discussed hereinabove, I have presented a somewhat simplified form of this tool in Figs. VII and VIII. The latter view shows the device in the unloaded position; and the former shows the extended position of the telescopic members when the tool is fully loaded.

In the modified form of device shown in Figs. VII and VIII, it is to be remarked that upper casing 50, being a hollow cylindrical affair, is provided with inwardly disposed annular shoulder 51 at its lowermost end, which shoulder may be beveled. The upper part of the casing 50 is provided with outwardly disposed flange 52.

through which machine screws 53 may be passed to fix the casing to any supporting member thereabove, as, for instance, member 54.

Screw plug 55 may be threadably carried within the upper end of casing 50, so that it is at once adjustable, up and down, and removable. Plug 55 should be provided with centrally disposed conical recess 56, in the lower center of which should be arranged the vertically disposed hole 57, passing entirely through the plug.

Bolt 58 may be threaded on its lower end and provided with head 59 on its upper end, so that its body may be passed through hole 57 and screwed into spring keeper plate 60, so that head 59 will be supported by plug 55. The plate 60 may be provided with a series of upward-looking concentric grooves therein, or a series of slightly elevated concentric shelves thereon, each arranged to hold the base of a spring.

A nest of springs, of which there may be primary spring 61, secondary spring 62 and tertiary spring 63, etc., will be set upon the spring keeper plate 60. The member 60 is suspended within the cylindrical and lowermost casing 65, of the telescopic casing assembly which is made up of the cylindrical members 50 and 65.

Casing 65 is provided at its upper end with an outwardly disposed ring or band 66, so fashioned as to provide on its under face a shoulder 67, which is preferably beveled as a complement to the upper face of shoulder 51. Whenever these shoulders come together in the operation of my device, the springs are fully loaded and the telescope is extended to its maximum.

Cap 68 may be threadedly and adjustably carried within the upper end of telescopic casing 65, so as to confine the nest of springs, and limit their upward movement.

Once suitable adjustment has been effected in the springs, so that their tension is as it should be (load and other factors considered), then the threaded key or plug 70 should be so made up through side wall or band 66, that the nose 71 of member 70 will enter one of the holes 72, provided at various intervals in the outer periphery of the side walls of the cap 68. This will lock the cap in place; and it will also allow the head 73, of plug 70, to be extended outside of the outer wall of band 66, and into a vertical slot or keyway 74, which is cut along the inner face of one side wall of the telescopic member 50. This will allow the telescopic members 50 and 65 to have a perfectly free axial movement, but it will prevent their rotation, as related to one another.

The bottom part of cylindrical casing 65 is partially closed with an inturned annular flange 75, having therethrough a vertical hole 76. Within this hole there may be carried shaft 80, which is attached to and suspended below the round flat and rotatable head 81. The members 80 and 81 together make up, in effect, a single rotatable primary load-carrying member; and the head should rest on a suitable thrust bearing, as at 82, to facilitate its rotation and lessen friction.

When it is desired to prevent the rotation of shaft 80, and of any tools and/or devices affixed thereto, then it is only necessary to have the key pin 83 of the latch 84 enter one of the peripheral holes 85 provided in the outer face of the head 81.

Latch 84 may be provided with a spring 86, about the pin 83, and behind the nut 87, and within the casing of the latch. Such arrangement will make it possible for the latch to be placed in or out of engagement, as desired, by moving the handle 88. When desired, the nut 87 may be made to work upon a wedge-like inclined plane (which may be provided with transverse notches) so as to make it possible to lock the pin 83 out of engageemnt, as well as allow it to go into engagement with the head 81. Any suitable latching device may be substituted for the one shown as at 84.

From the foregoing it should be easily seen that the simplified and modified form of device which I have delineated in Figs. VII and VIII, as well as the more elaborate embodiment of my invention, disclosed in the Figures I to VI, both present an extremely sturdy, stubby, and short telescopic tool of very limited vertical travel, yet of extreme strength and resilience, capable of carrying heavy loads and suspending them in a floating position of easy control.

In the short-compassed construction I have disclosed, and in the complete freedom of my spring case from load-carrying members, and in the use of the entire part of the spring space by springs themselves, I have contributed a distinctly novel design to resilient load-bearing extensible connector links, useful, especially, in the suspension of loads in oil field operations.

My design and construction and operation present decidedly distinct advantages over old style devices found heretofore in this art. I have freed these devices from the dangers of lateral thrust, and especially from the dangers of being bent, deflected or twisted out of operable relation. The cross-sectional area of my tool is so much greater than that of others heretofore found as to eliminate bending altogether.

It is believed that I have presented here, and for the first time in this art, design and arrangement whereby primary load carrying members of resilient and extensible links are found to consist of the two telescopic bodies of the housing of the tool.

The load suspended below this tool is transmitted through the tool only through the use of the housing members themselves. To say it another way: There is no primary load-carrying member extended up into or through the springs. One primary and beneficial result thereof is that there is no interference with the operation of these springs by any load carried therebelow. Of even greater benefit is the fact that, in my construction, there is no interference with the rotatability of any load carried below this tool by reason of the friction or engagement of the springs themselves with any part of the structure containing it.

The operation of my load-carrying resilient link should be easily understood from the foregoing statement of its structure, its purposes and its uses, and from a consideration of the drawings.

The mechanics of the structure involved in my load-carrying device is this: I provide an upper and a lower primary load-carrying member (which may be called A and B, respectively), so slideable on one another as to effect reciprocating action which will allow their combined overall length to be increased to a fixed limit and decreased to a fixed limit. The maximum limit is determined by the contact of a pair of shoulders, one on each member, and the pair being so arranged as to carry the full load when the members are in maximum extension. The minimum length of the combined members is fixed by a cross-piece so secured transversely of the top part of member A as to stop the upward movement of member B. A shank is suspended from this cross-piece so as to support a foot thereon laterally extended within the member B. Resilient means capable of effecting maximum extension of the unloaded members is confined between the foot and a transverse element carried across the top of member B. The load is attached to and suspended below member B. Such load may be allowed to rotate (if desired) and the resilient means is to have no effect whatsoever upon such rotation.

The resilient means employed in my invention may be made of any thing suitable, as (for instance) rubber composition or springs, or a combination of the two. When springs alone are used, they may be plural in number and separately removable (to vary total resilience); and they may be nested around one another or they may be independently and non-concentrically disposed, as in a cluster, or otherwise. The words "resilient means" should be read interchangeably with the word "spring" or "springs" throughout the foregoing specification.

I claim:

1. In a load suspending device, two telescopic members; a load-carrying offset arranged laterally on each such member, one such offset being at the upper end of the inner member and the other such offset being at the lower end of the outer member, such offsets engaging each other when the load is suspended; a head arranged transversely of the top of the outer member, said head being provided with an opening therethrough; a shank depending through said opening, the shank being provided with a cap larger than the opening; a foot carried on the lower end of the shank; a spring retaining element arranged transversely of the upper part of the inner member; a spring held under compression between said foot and said element; a rotatable disc lying within the base of the inner member and carried thereby; anti-friction means arranged between the disc and the bottom of the last named member; a shaft depending from said disc and passing through a hole in said bottom; and a load-supporting link suspended from the shaft.

2. In a load suspending device, two telescopic members; a load-carrying offset arranged laterally on each such member, such offsets engaging each other when the load is suspended; a cross-piece arranged transversely of the outer member at its top; a cross-piece arranged transversely of the inner member at its top; a shank depending from the first named cross-piece and into the inner member; a resilient body supported by said shank and extending between its shank support and the second named cross-piece; an anti-friction bearing ring lying within and supported by the base of the inner member; a rotatable disc resting on said ring, the peripheral face of such disc being provided with holes in spaced relation thereabout; a spring urged latch mounted on the side wall of the inner member and having a tongue removably passing therethrough and into one of said holes; and a link suspended from said disc.

3. In a load suspending device, two telescopic members; a load-carrying offset arranged laterally on each such member, such offsets engaging each other when the load is suspended; a cross-piece arranged transversely of the outer member; a shank depending from such cross-piece into the inner member, the shank having a foot thereon; a cross-piece arranged transversely of the top of the inner member; resilient means disposed between the last named cross-piece and the foot of the shank; a rotatable disc carried within the inner member and supported by its base; a shaft extending from such disc downwardly through such base; and a rotatable link depending from such shaft.

4. In a load suspending device, two telescopic members; a load-carrying offset arranged laterally on each such member, such offsets engaging each other when the load is suspended; a cross-piece secured transversely of the outer member; a shank suspended from the cross-piece; a foot secured to the shank and depending within the inner member; a cross-piece arranged transversely of the top of the inner member; resilient means confined by and between the last named cross-piece and the foot; a rotatable head arranged within the inner member below said foot and supported by the base of the inner member; a thrust bearing arranged between the head and such base; a locking latch carried externally of the wall of the inner member, the latch being provided with a spring urged tongue passing through an opening in said wall; a series of spaced holes provided in the peripheral face of the head into which the latch tongue may be selectively placed; and key-and-keyway means preventing relative rotation between the members.

5. In a load suspending device, a hollow outer cylinder; a load-carrying inturned flange at the lower end of such cylinder and made integral therewith; a cross member at the upper end of such cylinder; a shank depending from such cross-member; a spring carried on such shank; a hollow inner cylinder surrounding said spring; a member arranged above said spring and across said inner cylinder; rotatable means carried by the inner cylinder for suspending a load; and an out-turned flange at the upper end of the last named cylinder, said flange being extended sufficiently to rest upon the first named flange and both flanges coacting to support the unsprung weight of the load suspended below the cylinders.

6. In a device for suspending loads, two telescopic members; a load-carrying offset arranged laterally on each such member, such offsets engaging each other when the load is suspended; a resilient body arranged wholly within the inner telescopic member and engaging its top; a supporting shank depending from the top of the outer telescopic member and supporting the base of the resilient body; a rotatable link depending from the bottom of the inner telescopic member; and a latch on the last named member operable to prevent rotation of the link.

ROY C. DAVIS.

REFERENCES CITED

The following references are of record in the file of this patent:

UNITED STATES PATENTS

| Number | Name | Date |
|---|---|---|
| 1,022,225 | Chabot | Apr. 2, 1912 |
| 1,214,120 | Boyne | Jan. 30, 1917 |
| 1,876,145 | McGrew | Sept. 6, 1932 |
| 2,123,388 | Viguerie | July 12, 1938 |
| 2,385,891 | Swanson | Oct. 2, 1945 |